United States Patent
Shin et al.

(10) Patent No.: US 7,133,248 B2
(45) Date of Patent: Nov. 7, 2006

(54) HARD DISC DRIVE HAVING A BASE INCLUDING A CHANNEL AT THE BOTTOM OF A MOVING REGION AND CORRESPONDING TO A MOVING PATH OF A SLIDER

(75) Inventors: Sang-chul Shin, Gyeonggi-do (KR); Woo-chuol Jeong, Gyeonggi-do (KR); Chul-woo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 625 days.

(21) Appl. No.: 10/642,690

(22) Filed: Aug. 19, 2003

(65) Prior Publication Data

US 2004/0095679 A1 May 20, 2004

(30) Foreign Application Priority Data

Aug. 19, 2002 (KR) ............................. 2002-48974

(51) Int. Cl.
*G11B 17/02* (2006.01)
(52) U.S. Cl. ............................ 360/97.01; 360/97.02
(58) Field of Classification Search ............ 360/97.01, 360/97.02, 97.03
See application file for complete search history.

(56) References Cited

U.S. PATENT DOCUMENTS

| 5,412,522 | A | | 5/1995 | Lockhart et al. | |
|---|---|---|---|---|---|
| 5,541,791 | A | * | 7/1996 | Yamasaki et al. | 360/256.1 |
| 5,546,250 | A | | 8/1996 | Diel | |
| 5,598,306 | A | | 1/1997 | Frees et al. | |
| 5,898,545 | A | * | 4/1999 | Schirle | 360/254.7 |
| 5,982,580 | A | | 11/1999 | Woldemar et al. | |
| 6,351,344 | B1 | * | 2/2002 | Krum et al. | 360/97.01 |
| 6,728,062 | B1 | * | 4/2004 | Ou-Yang et al. | 360/97.02 |
| 6,791,790 | B1 | * | 9/2004 | Lee | 360/97.02 |
| 6,891,696 | B1 | * | 5/2005 | Ou-Yang et al. | 360/97.02 |
| 6,894,866 | B1 | * | 5/2005 | Nishijima et al. | 360/97.02 |
| 6,922,308 | B1 | * | 7/2005 | Butler | 360/97.02 |
| 7,009,808 | B1 | * | 3/2006 | Kovinskaya et al. | 360/97.02 |
| 7,031,104 | B1 | * | 4/2006 | Butt et al. | 360/97.02 |
| 2003/0081350 | A1 | * | 5/2003 | Wang et al. | 360/97.02 |
| 2003/0147175 | A1 | * | 8/2003 | Tadepalli et al. | 360/97.02 |
| 2003/0151848 | A1 | * | 8/2003 | Lee | 360/97.02 |

FOREIGN PATENT DOCUMENTS

JP          5234327          8/1993

* cited by examiner

*Primary Examiner*—Jefferson Evans
(74) *Attorney, Agent, or Firm*—Staas & Halsey LLP

(57) ABSTRACT

A hard disc drive includes a base having a moving region in which an air damping ramp adjacent to a recording surface of a disc, a slider, and a driving unit which holds the slider, move. A bottom of the moving region is lower than the air damping ramp, and has a channel that is recessed at the bottom of the moving region and extends along a moving path of the slider. Thus, the hard drive reduces a vortex that forms around a head gimbal assembly (HGA) due to an application of insufficient preload onto HGA or a defective HGA. Accordingly, vibration of the HGA due to the vortex decreases, thus rendering a position error signal (PES) more accurate and reliable.

25 Claims, 7 Drawing Sheets

HARD DISC DRIVE HAVING A BASE INCLUDING A CHANNEL AT THE BOTTOM OF A MOVING REGION AND CORRESPONDING TO A MOVING PATH OF A SLIDER

CROSS-REFERENCE TO RELATED APPLICATIONS

This application claims the priority of Korean Patent Application No. 2002-48974 filed Aug. 19, 2002, in the Korean Intellectual Property Office, the disclosure of which is incorporated herein in its entirety by reference.

BACKGROUND OF THE INVENTION

1. Field of the Invention

The present invention relates to a hard disc drive in which vibration of a slider due to a flow of air caused when a disc rotates may be effectively reduced.

2. Description of the Related Art

FIG. 1 is a cross-sectional view of a general single-channel type hard disc drive that drives a single disc or a single head. Referring to FIG. 1, the hard disc drive includes a disc 1 having a recording surface on which information is recorded, and a head gimbal assembly (HGA) 2.

The disc 1 is rotated by a spindle motor 4 installed on a base 3. The HGA 2 includes a slider (not shown) having a magnetic head to write data on and to read data from the recording surface of the disc 1. The HGA 2 is combined with a suspension 7 that is combined with an actuator 6 that is driven by a voice coil motor 5 to rotate with respect to a pivot bearing 6a. The structure of the HGA 2 is well known in the field of disc recording/reproducing apparatuses, and therefore its detailed description will be omitted here.

The recording surface of the disc 1 faces the base 3, and the HGA 2 is positioned between the base 3 and the disc 1 and moves along the recording surface of the disc 1. As shown in FIG. 2, a space for the disc 1 and the aforementioned related elements is encompassed by a frame 3a. The frame 3a is closely adhered with a lid (not shown) that seals the space. A ramp 3b is provided very close to the recording surface of the disc 1 at a bottom of the base 3, so as to provide an air damping region of the disc 1. A slider moving region 3c is a place where the HGA 2 and the suspension 7, which holds the HGA 2, move. The slider moving region 3c is lower than the ramp 3b. Also, a recession 4b is provided at a flange 4a of the spindle motor 4 to be level with the slider moving region 3c. The recession 4b allows the suspension 7 to move within the slider moving region 3c. In conclusion, the ramp 3b is lower than the flange 4a and the slider moving region 3c is lower than the ramp 3b. Also, a distance between the disc 1 and the base 3 is set to be very narrow, except at the slider moving region 3c.

In the hard disc drive, the disc 1 rotates within a space defined by the base 3 and the lid which is put on the base 3 to close the space. The rotation of the disc 1 enables air to flow along the shape of the space provided in the hard disc drive. The rotation of the disc 1 results in a flow of air in the hard disc drive, and then, the flow of air causes the HGA 2 to rise to an equilibrium position where a rising force from the flow of air is equal and opposite to a preload (or gramload) applied to the head. A head suspension assembly (HSA), which includes the HGA 2 and the suspension 7, vibrates due to the flow of air caused by the rotation of the disc 1. That is, the suspension 7 and the HGA 2, which is attached to a front of the suspension 7, vibrate due to the flow of air in the hard disc drive. The suspension 7 and the HGA 2 vibrate with a particular bandwidth of frequency, generally around 10 KHz.

In general, the HSA is set to apply a preload to the slider so that the slider has a rising height (Z-height) in accordance with the rotation speed. However, if excessive or insufficient preload is applied to the slider or the slider is abnormally positioned in the HGA 2, the suspension 7 and the HGA 2 locally vibrate to a large degree at a particular frequency bandwidth, e.g., 10 KHz. The local vibration deteriorates a position error signal (PES), and as a result, causes errors. For instance, when the slider (more specifically, a reading element or a writing element included in the slider) performs reading/writing operations at a target track, the vibration may cause the slider to read data from or write data to an adjacent track, not the target track, thereby deteriorating performance of the hard disc drive, as well as the servo characteristics of the hard disc drive.

SUMMARY OF THE INVENTION

Accordingly, it is an aspect of the present invention to provide a hard disc drive in which vibration of an HGA due to flow of air may be effectively suppressed.

Additional aspects and advantages of the invention will be set forth in part in the description which follows and, in part, will be obvious from the description, or may be learned by practice of the invention.

The foregoing and/or other aspects of the present invention are achieved by providing a hard disc drive including a disc on which information is stored, a slider including a head that performs reading and writing operations on the disc, a driving unit that drives the slider, and a base including an air damping ramp adjacent to a recording surface of the disc, and a moving region in which the slider and the driving unit move. A bottom of the moving region is lower than the air damping ramp. A channel is provided to be recessed at the bottom of the moving region, and extends along a moving path of the slider.

According to an aspect of the invention, the channel is a predetermined distance from an edge of the air damping ramp or extended to the air damping ramp.

According to an aspect of the invention, sidewalls of a channel are inclined with respect to a bottom of the channel, and the sidewalls of the channel are inclined to degrees of 45° or less.

According to an aspect of the invention, the channel is provided beneath the slider.

According to another aspect of the invention, the driving unit includes an actuator arm to rotate under a power of a voice coil motor installed in the base, and a suspension, one end of which is combined with the actuator arm and the other end of which is combined with the slider.

BRIEF DESCRIPTION OF THE DRAWINGS

The above and/or other aspects and advantages of the present invention will become more apparent by describing in detail preferred embodiments thereof with reference to the accompanying drawings in which.

DETAILED DESCRIPTION OF THE PREFERRED EMBODIMENTS

Figure 1:
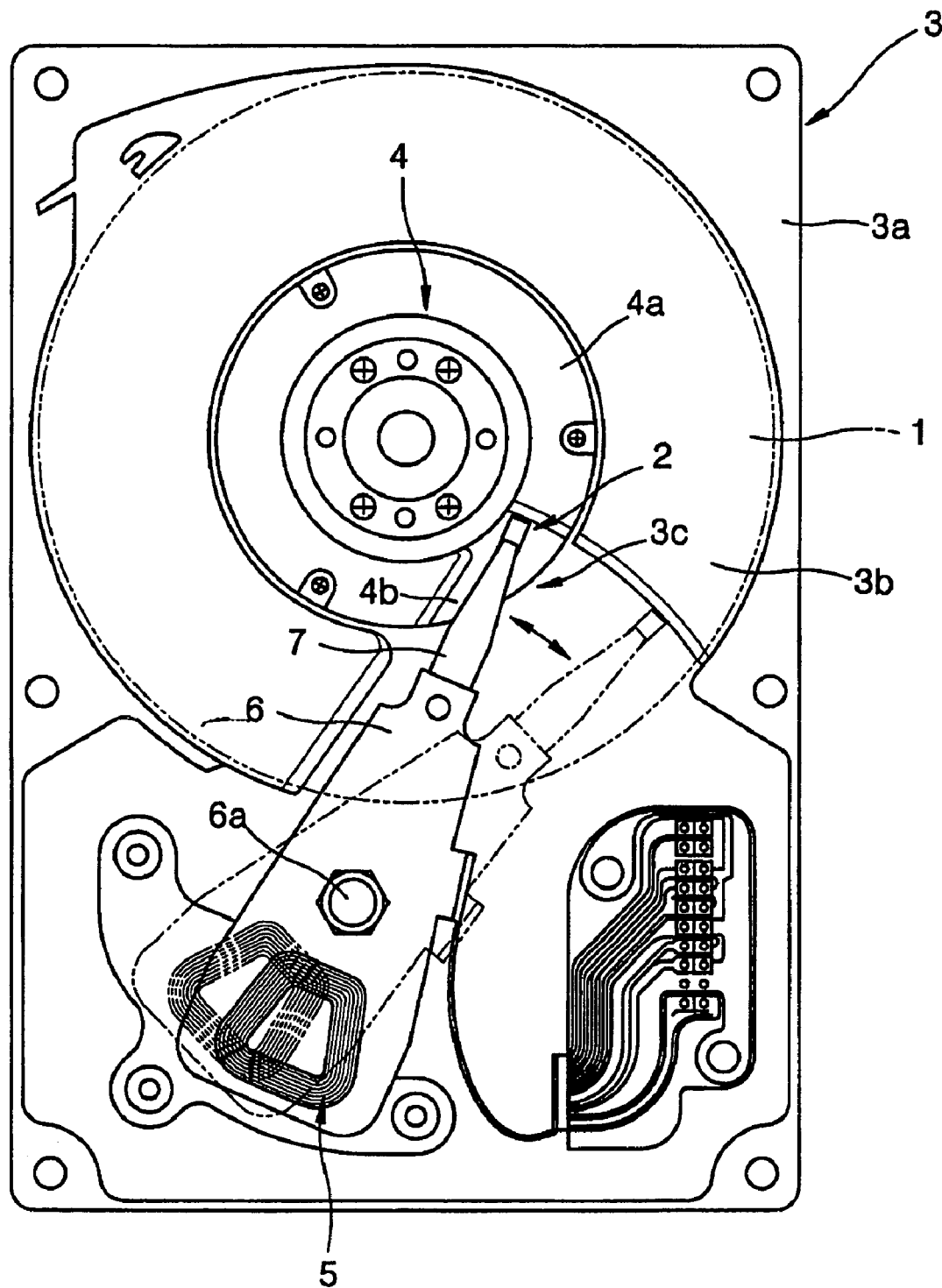
FIG. 1 is a schematic plan view of a conventional hard disc drive.
Figure 2:
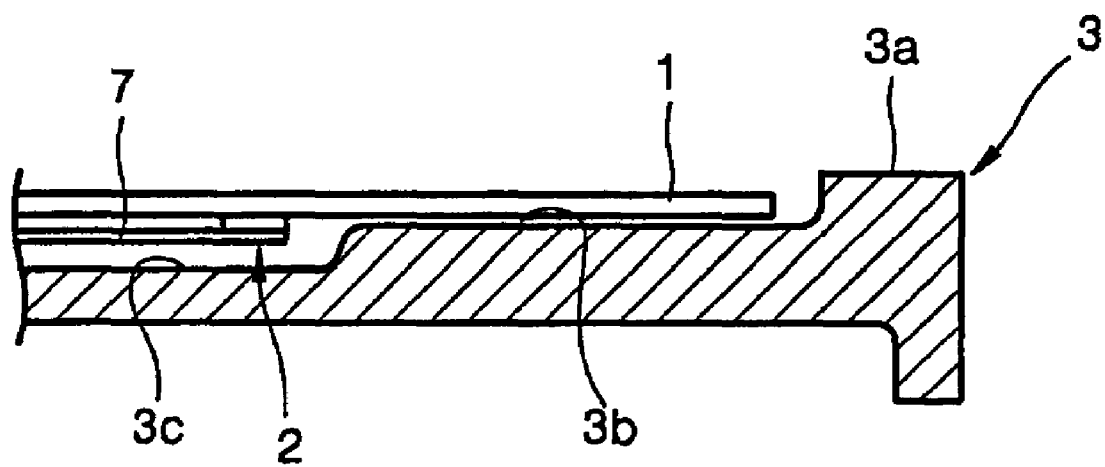
FIG. 2 is a cross-sectional view of the hard disc drive of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
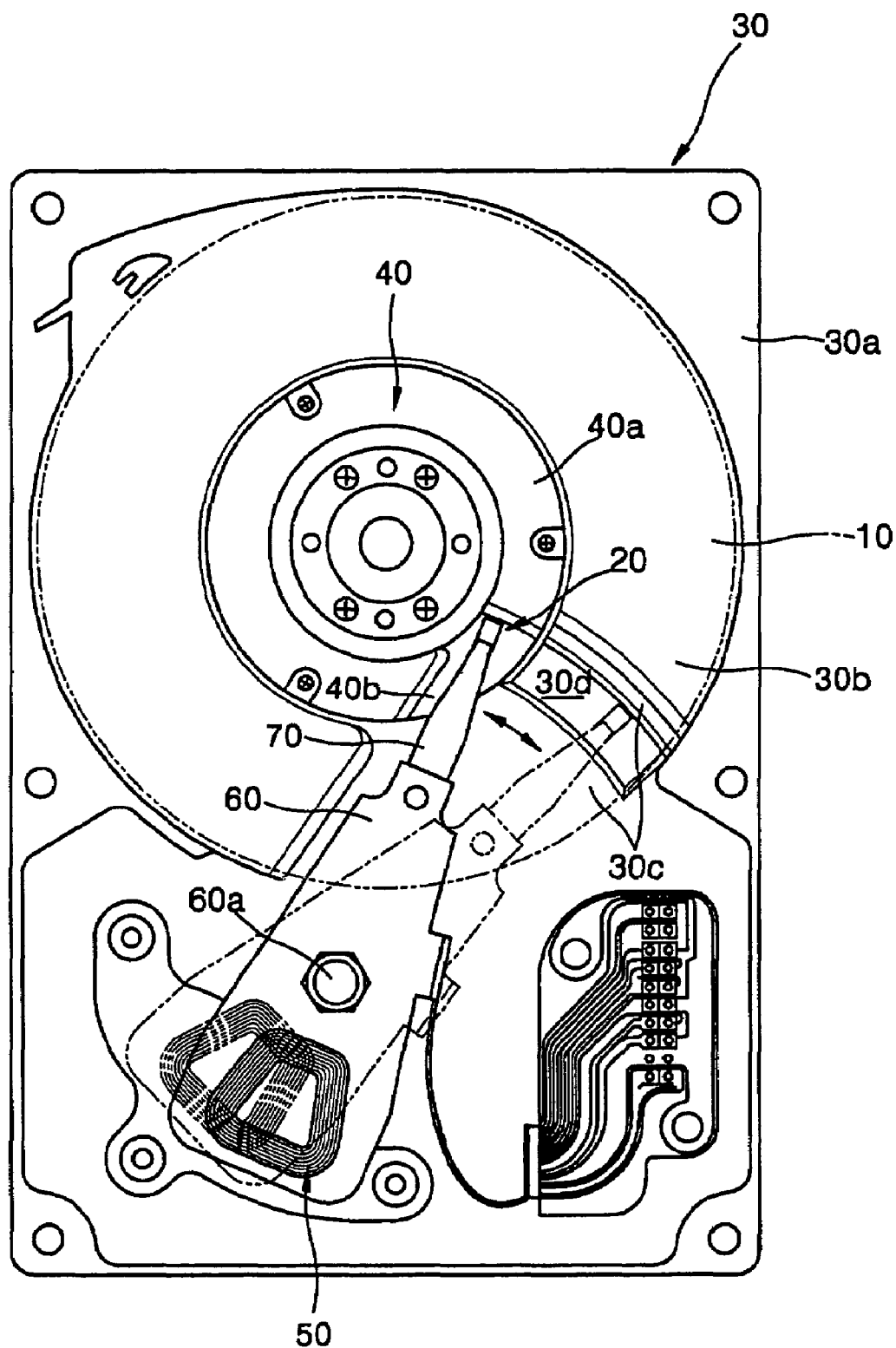
FIG. 3 is a schematic plan view of a hard disc drive, according to an embodiment of the present invention.

FIG. 3 is a schematic plan view of a single-channel hard disc drive, which adopts a single disc and a single head, according to an embodiment of the present invention. Although the present invention discloses the embodiment of the single-channel hard disc drive, a multiple-channel hard disc drive including multiple discs and multiple heads may also be used. The hard disc drive of FIG. 3 includes a channel 30d in a slider moving region 30c to move a head gimbal assembly (HGA) 20 and a suspension 70 within the slider moving region 30c. The channel 30d extends along a path in which air flows on an upper surface of a base 30.

Referring to FIG. 3, a disc 10, which includes a recording surface, i.e., a bottom on which information is recorded, is combined with a spindle motor 40 installed on the base 30. The disc 10 is encircled by a frame 30a and an air damping ramp 30b is provided adjacent to the recording surface (bottom) of the disc 10 at an interior of the frame 30a. Also, the HGA 20 is positioned at the recording surface of the disc 10 and further includes a slider (not shown) having a magnetic head that performs reading and writing operations. As is known in the related art, the slider includes reading and writing elements that read information from and write information to the recording surface of the disc 10. One end of the suspension 70 is combined with the HGA 2 and the other end thereof is combined with an actuator 60 that rotates about a pivot bearing 60a under a power of a voice coil motor 50.

As mentioned above, the HGA 2 and the suspension 70 which holds the HGA 20, are installed in the slider moving region 30c. The slider moving region 30c is provided through the air damping ramp 30b such that the air damping ramp 30b takes on a "C" shape formed around a rotating axis of the disc 10.

Figure 4:
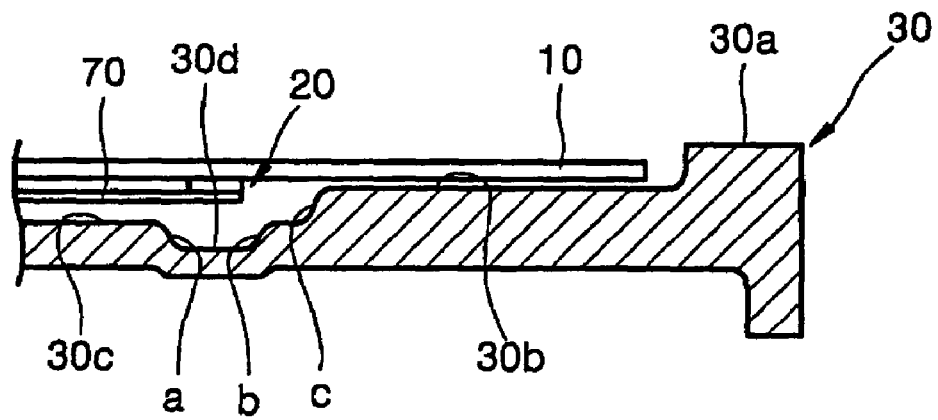
FIG. 4 is a cross-sectional view of the hard disc drive of FIG. 3.
Figure 5A:
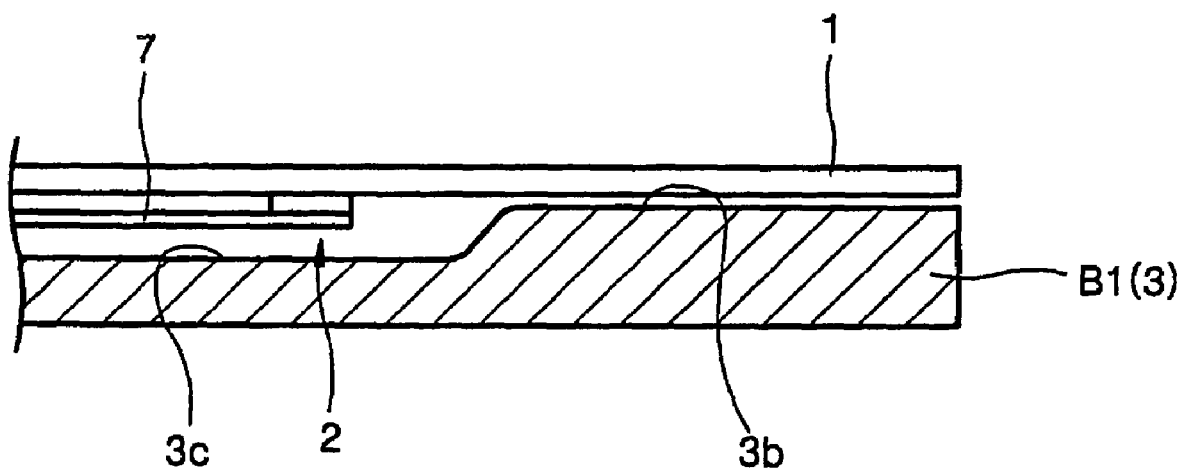
FIGS. 5A and 5B are magnified views of the hard disc drives shown in FIGS. 2 and 4, respectively.
Figure 5B:
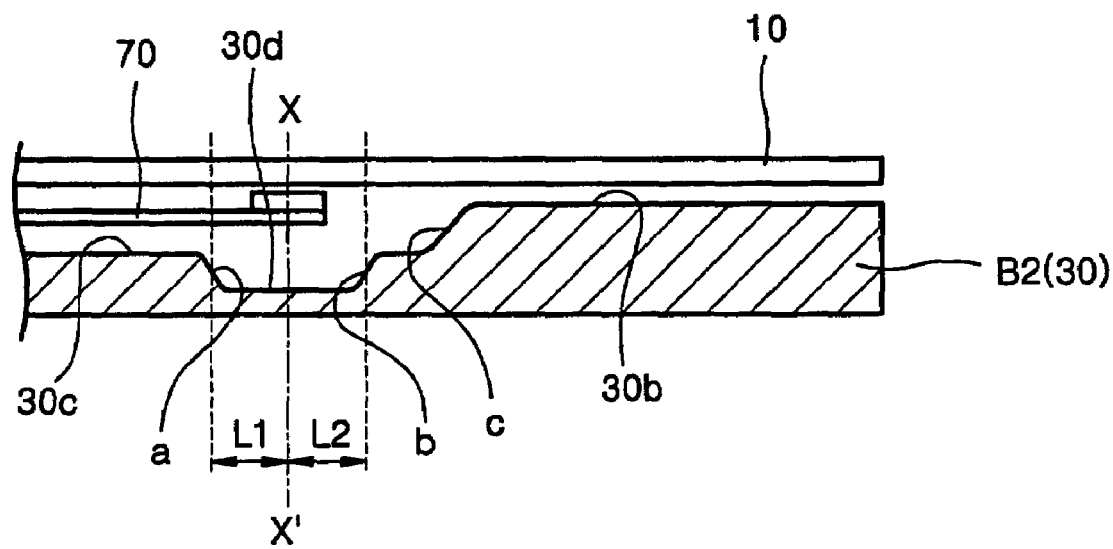

Referring to FIGS. 4 and 5B, the recording surface of the disc 10 is very close to an upper surface of the air damping ramp 30b on the base 30. Around an outer perimeter of damping ramp 30b, the frame 30a acts as a flange. The frame 30a is adhered with a lid (not shown) that covers the disc 10 and the aforementioned related elements.

The slider moving region 30c, in which the HGA 20 and the suspension 70 move, is shaped to be deeper than the air damping ramp 30b. For movement of the suspension 70, a flange 40a of the spindle motor 40 includes a recession 40b that is level with the slider moving region 30c. That is, the air damping ramp 30b is lower than the frame 30a and the slider moving region 30c is lower than the air damping ramp 30b. The distance between the disc 10 and the base 30 is set to be very narrow, except at the slider moving region 30c.

The channel 30d, which is defined by sidewalls a and b, is formed to a predetermined depth at the bottom of the base 30 directly under the HGA 20, thereby making a path of the flow of air longer. The bottom of the channel 30d is connected to the bottom of the slider moving region 30c via the sidewalls a and b, and a surface of the air damping ramp 30b is connected to the bottom of the slider moving region 30c via an incline plane c and a rounded edge of the air damping ramp 30b as shown in FIG. 5B. Preferably, the sidewalls a and b have slopes of 45° or less in order to suppress an occurrence of vortex during the flow of air. Further, it is preferable that the incline plane c of the air damping ramp 30b has also a slope of 45° or less.

As shown in FIG. 5B, a central line X–X' passing through the HGA 20 intersects the bottom of the channel 30d at predetermined distances L1 and L2 from the sidewalls a and b. Thus, for example, the central line X–X' is an equal distance from the sidewalls a and b. A formation of the channel 30d largely suppresses vibration of the HGA 20 and the suspension 70, particularly, local vibration at a frequency of approximately 10 KHz due to application of an abnormal preload to the slider or inappropriate assembling of the slider with the HGA 20.

A preload is applied to a head suspension assembly which includes the HGA 20 and the suspension 70 holding the HGA 20. Thus, when the disc 10 rotates in the hard disc drive, the slider rises to an equilibrium position where a balance between force on the slider due to the air flow and the preload is achieved. The preload is predetermined to obtain a desired equilibrium distance from the recording surface of the disc. When the slider rises to the equilibrium position, the flow of air results in the formation of a vortex at a front of the suspension 70, particularly, around the HGA 20, thereby causing abnormal vibration of the HGA 20. The HGA 20 vibrates more intensely when the preload applied to the HGA 20 is not precisely determined in consideration of a rotation speed of the disc 10.

To prevent vibration of the HGA 20, the hard disc drive according to the present invention further includes the channel 30d which has the inclined sidewalls a and b in the base 30. With the formation of the channel 30d, it is possible to widen the passage through which air flows past the HGA along the surface of the base 30 to make the air also flow along the inclined sidewalls a and b and the bottom of the channel 30d, adjacent to the HGA 20. As a result, a flow rate of air decreases to reduce the vortex formed around the HGA 20, and thus, vibration of the HGA 20 due to the vortex also decreases.

Figure 5C:
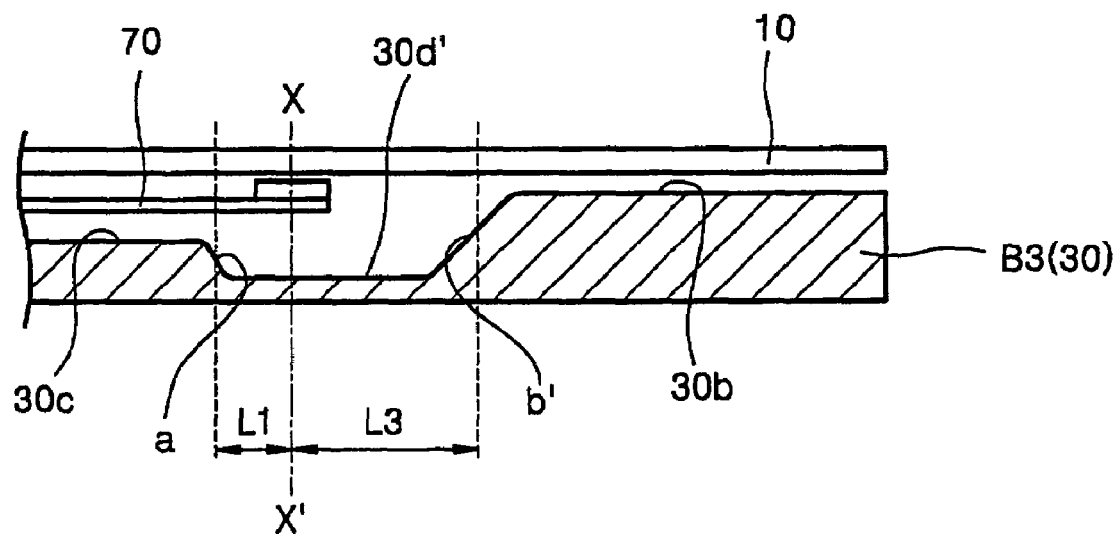
FIG. 5C is a cross-sectional view of a hard disc drive, according to another embodiment of the present invention.

The base 30 according to another embodiment of the present invention includes a channel 30d' as shown in FIG. 5C. As compared to the channel 30d according to the aforementioned embodiment, a length of the channel 30d' extends to an air damping ramp 30b and the channel 30d' has an inclined sidewall b' which is combined with the sidewall b and the incline plane c of the channel 30d of FIG. 5B. Referring to FIG. 5C, a central line X–X' passing through an HGA 20 intersects the bottom of the channel 30d' at predetermined distances L1 and L3 from the inclined sidewalls a and b'. Similar to the base 30 according to the aforementioned embodiment, it is preferable that the sidewalls a and b' of the channel 30d' have slopes of 45° or less.

Figure 6:
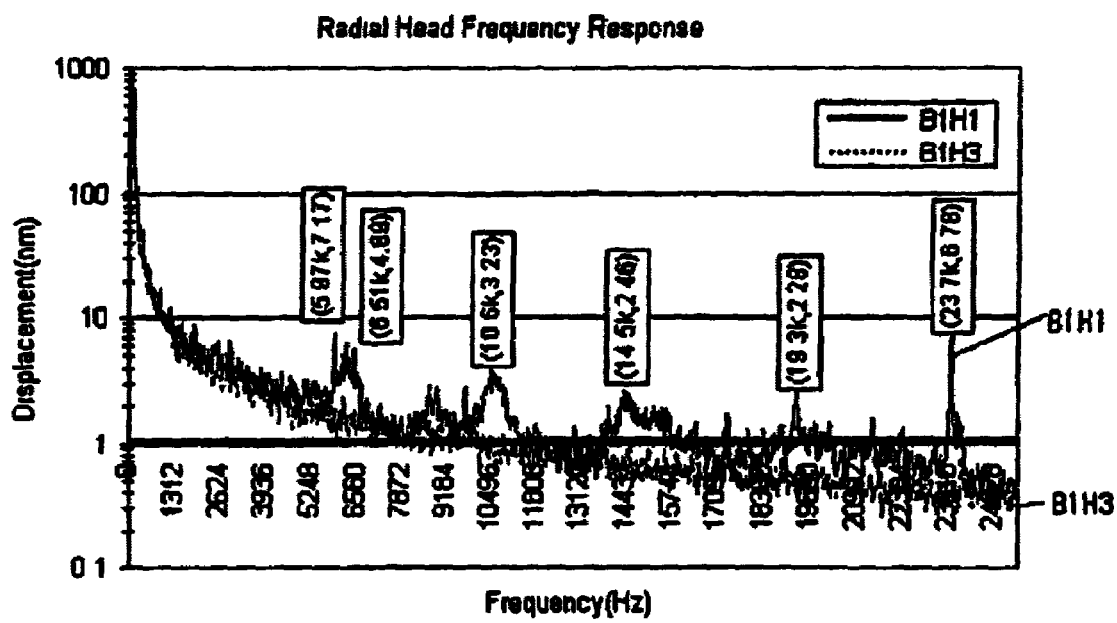
FIGS. 6 through 8 are graphs illustrating radial head frequency response of the hard disc drives shown in FIGS. 5A through 5C when a normal head gimbal assembly (HGA) and an abnormal HGA are applied to these hard disc drives, respectively.
Figure 7:
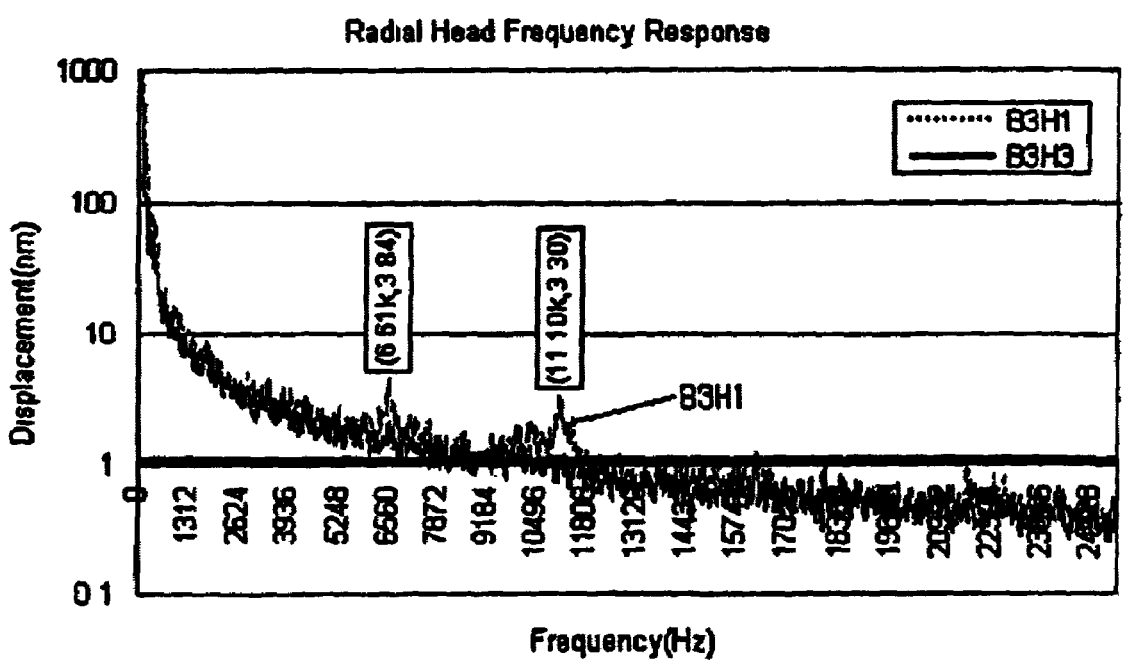
Figure 8:
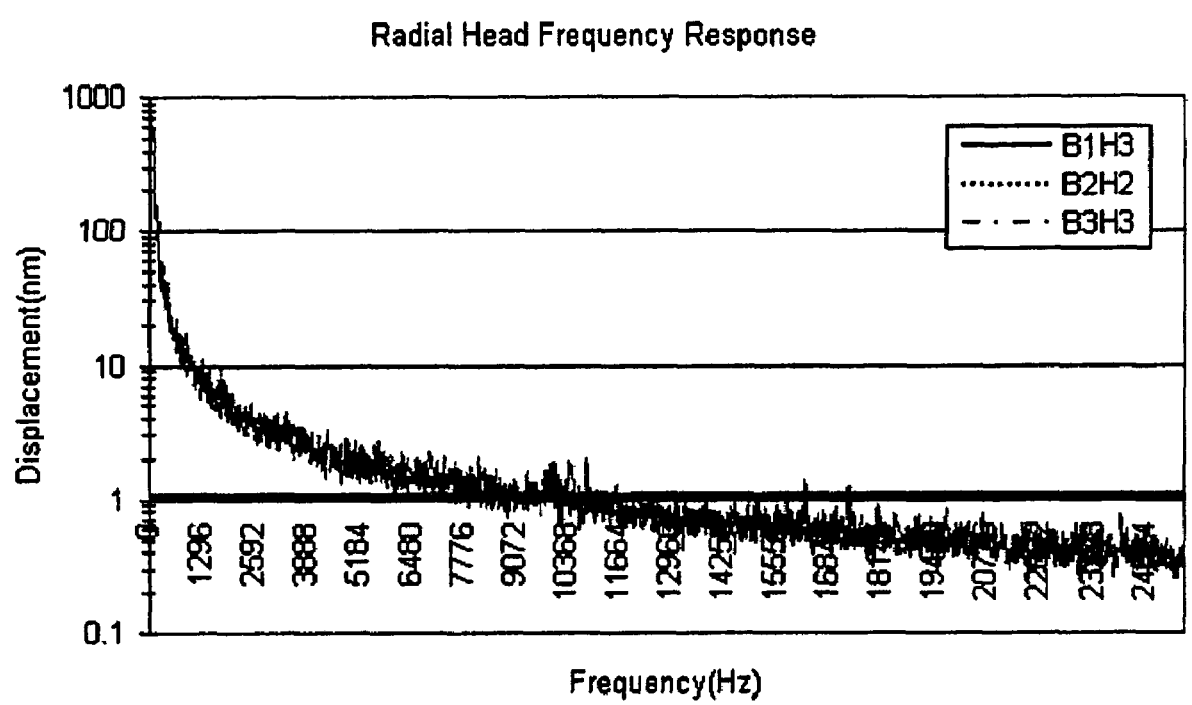

FIG. 6 is a graph illustrating radial head frequency response of a conventional hard disc drive. FIGS. 7 and 8 are graphs illustrating radial head frequency responses of hard disc drives according to the embodiments of the present invention.

B1 denotes the base 3 of the conventional hard disc drive of FIG. 1, the base 3 including a slider moving region having a flat surface as shown in FIG. 5A. B2 denotes the base 30, shown in FIG. 4, of a hard disc drive according to an embodiment of the present invention, the base 30 having the channel 30d beneath the HGA 20 as shown in FIG. 5B. B3 denotes the base 30 in a hard disc drive according to another embodiment of the present invention, shown in FIG. 5C. H1 denotes an HGA whose performance is good except that an insufficient preload is applied thereto, or an HGA with structural defects. H2 and H3 denote normal HGAs of different types whose performances are good, an appropriate preload is applied thereto, and which are structurally stable. For instance, B1H1 denotes a conventional hard disc drive including a base with a flat slider removing region, and an HGA to which an insufficient preload is applied or which has structural defects.

Referring to FIG. 6, if the defective HGA H1 is attached to the general base B1 having no channel, high-displacement vibration occurs in the hard disc drive at particular frequencies. The vibration interrupts a position error signal (PES), in particular, at about 10 KHz, thereby deteriorating the performance of the hard disc drive.

Referring to FIG. 7, when the defective HGA H1 is installed in the base 30 B3 having the channel 30d' shown in FIG. 5C, vibration is markedly reduced, especially, around 10 KHz, when compared to FIG. 6.

FIG. 8 illustrates the radial head frequency responses of hard disc drives having the normal HGAs H2 and H3 installed in the three types of bases B1, B2, and B3, respectively. FIG. 8 reveals that the hard disc drives show almost the same radial head frequency responses regardless of the presence of a channel in a base if the normal HGAs H2 and H3 are adopted.

Also, FIGS. 6 through 8 reveal that it is possible to significantly reduce vibration of an HGA when the bases B2 and B3 having the channels 30d and 30d' of FIGS. 5B and 5C are used.

As described above, in a hard disc drive according to the present invention, a channel is provided in a slider moving region, thus reducing a vortex occurring around a head gimbal assembly (HGA) due to an application of insufficient preload to the HGA or a defective HGA. Accordingly, vibration of the HGA caused by the vortex decreases, and a position error signal (PES) becomes more accurate and reliable.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hard disc drive, comprising:
   a disc on which information is stored;
   a slider including a head to perform reading and writing operations on the disc;
   a driving unit to drive the slider;
   a base including:
      an air damping ramp adjacent to a recording surface of the disc, and
      a moving region in which the slider and the driving unit move, a bottom of the moving region being lower than the air damping ramp, and
      a channel provided to be recessed at the bottom of the moving region, and to extend along the moving path of the slider.

2. The hard disc drive of claim 1, wherein the channel is a predetermined distance from an edge of the air damping ramp.

3. The hard disc drive of claim 2, wherein sidewalls of the channel are inclined with respect to a bottom of the channel.

4. The hard disc drive of claim 3, wherein the sidewalls of the channel are inclined at 45° or less to suppress an occurrence of vortex during air flow in the hard disc drive.

5. The hard disc drive of claim 2, wherein the edge of the air damping ramp which faces the moving region is inclined.

6. The hard disc drive of claim 2, wherein the channel is provided beneath the slider.

7. The hard disc drive of claim 1, wherein the channel extends to the air damping ramp.

8. The hard disc drive of claim 7, wherein sidewalls of the channel are inclined with respect to a bottom of the channel.

9. The hard disc drive of claim 8, wherein the sidewalls of the channel are inclined at 45° or less to suppress an occurrence of vortex during air flow in the hard disc drive.

10. The hard disc drive of claim 7, wherein the channel is provided beneath the slider.

11. The hard disc drive of claim 1, wherein the driving unit comprises:
    an actuator arm to rotate under a power of a voice coil motor installed in the base; and
    a suspension, one end of which is combined with the actuator arm and the other end of which is combined with the slider to move within the moving region.

12. A hard disc drive having a disc, a slider, and a driving unit, comprising:
    a base including:
    an air damping ramp adjacent to a recording surface of the disc;
    a moving region in which the slider and the driving unit move, a bottom of the moving region being positioned at a level different from the air damping ramp; and
    a channel formed to be recessed at the bottom of the moving region and to extend along a moving path of the slider, reducing a vortex occurring around the slider and reducing vibration in the hard disc drive.

13. The hard disc drive of claim 12, wherein the channel is a predetermined distance from an edge of the air damping ramp.

14. The hard disc drive of claim 13, wherein sidewalls of the channel are inclined with respect to a bottom of the channel.

15. The hard disc drive of claim 14, wherein the sidewalls of the channel are inclined at 45° or less to suppress an occurrence of vortex during air flow in the hard disc drive.

16. The hard disc drive of claim 14, wherein a central line which passes through a head of the slider intersects the bottom of the channel at a predetermined distance from the sidewalls of the channel.

17. The hard disc drive of claim 14, wherein a head of the slider is positioned at a center of the bottom of the channel.

18. The hard disc drive of claim 14, wherein at least one of the sidewalls of the channel has a ramp positioned between the edge of the air damping ramp and the bottom of the channel.

19. The hard disc drive of claim 14, wherein a central line which passes through a head of the slider is an equal distance from the sidewalls of the channel.

20. The hard disc drive of claim 13, wherein the edge of the air damping ramp which faces the moving region is inclined.

21. The hard disc drive of claim 13, wherein the channel is provided beneath the slider.

22. The hard disc drive of claim 12, wherein the channel extends to the air damping ramp.

23. The hard disc drive of claim 22, wherein sidewalls of the channel are inclined with respect to a bottom of the channel.

24. The hard disc drive of claim 23, wherein the sidewalls of the channel are inclined at 45° or less to suppress an occurrence of vortex during air flow in the hard disc drive.

25. The hard disc drive of claim 22, wherein the channel is provided beneath the slider.

* * * * *